United States Patent [19]

Mangiavacchi

[11] Patent Number: 4,915,531
[45] Date of Patent: Apr. 10, 1990

[54] DISC CLUTCH

[75] Inventor: Jacques G. Mangiavacchi, Chatou, France

[73] Assignee: GKN Cardantec International Gesellschaft für Antriebstechnik mbH, Essen, Fed. Rep. of Germany

[21] Appl. No.: 270,953

[22] Filed: Nov. 14, 1988

Related U.S. Application Data

[63] Continuation-in-part of Ser. No. 263,593, Oct. 27, 1988, abandoned.

[30] Foreign Application Priority Data

Nov. 11, 1987 [DE] Fed. Rep. of Germany ....... 3738210

[51] Int. Cl.[4] .................................................. F16D 1/00
[52] U.S. Cl. ..................................... 403/337; 403/359; 403/380
[58] Field of Search ................. 403/380, 97, 364, 337, 403/340, 359

[56] References Cited

U.S. PATENT DOCUMENTS

| | | |
|---|---|---|
| 1,177,638 | 4/1916 | Larson et al. ......................... 403/97 |
| 1,307,160 | 6/1919 | Stokes .................................... 403/97 |
| 4,191,487 | 3/1980 | Schultenkamper ................. 403/337 |
| 4,241,593 | 12/1980 | Matyl et al. ..................... 403/337 X |
| 4,253,776 | 3/1981 | Orain .................................... 403/337 |
| 4,343,561 | 8/1982 | Campanini ...................... 403/359 X |
| 4,344,305 | 8/1982 | Holmes ........................... 403/359 X |

Primary Examiner—Andrew V. Kundrat
Assistant Examiner—Peter M. Cuomo
Attorney, Agent, or Firm—Toren, McGeady & Associates

[57] ABSTRACT

A disc clutch for use in drive lines of automobiles, including a flange driving member and a yoke driving member, one flange having a through hole and the other flange having a cam with threaded bores as well as bored steps. Torque transmission is effected via toothed portions with trapezoidal teeth whereas axial fixing is achieved via fixing bolts.

9 Claims, 2 Drawing Sheets

DISC CLUTCH

This application is a continuation-in-part of Ser. No. 07/263,593, filed 10/27/88, now abandoned.

BACKGROUND OF THE INVENTION:

The invention relates to a disc clutch, including a first and a second clutch part with two radially extending flanges which are removably connected to each other via teeth on their clutch faces, and via connecting bolts arranged in the region of the teeth.

With disc clutches of this type, torque transmission is effected via the teeth, whereas axial fixing is achieved via the bolted connection. Each of the two flanges is provided with through bores through which the connecting bolts are taken. The heads of the connecting bolts contact the respective planar face of one flange and extend through the through-bores of both flanges. A nut is screwed onto the free, threaded end of the connecting bolts and is tightened with a certain amount of pretension in order to prevent unfastening in all operating conditions.

However, the disadvantage of this design is that for assembling the connection, it is necessary to use two tools, i.e., two wrenches have to be used to produce an effective connection. A further disadvantage is that assembly cannot be automated, i.e., fastening of the bolts cannot be carried out by, for example, a robot.

This is particularly disadvantageous in connection with the assembly of motor vehicles. There are further difficulties if tightening has to take place under restricted space conditions because one of the flanges, for example, is closely connected to a gear box output. There is also a risk that accurate tightening is not possible, especially in those cases where assembly takes place manually. Furthermore, because of the arrangement of the bolts, the compressive force is distributed to a limited extent, and thus, primarily acts upon the teeth immediately adjoining the bore.

SUMMARY OF THE INVENTION

In view of these drawbacks, it is an object of the present invention to provide a disc clutch which, while requiring the same axial space as prior art disc clutches, permits simplified and safer assembly procedures and insures a high fatigue strength of the pretensioned connection while improving the distribution of the compressive forces on the teeth.

Pursuant to this object, and others which will become apparent hereinafter, one aspect of the present invention resides in one of the flanges being provided with a through hole for the connecting bolts, while the other flange on its radial face, facing away from the toothed portions is provided with axially projecting cams comprised of bores which have been provided with threads for the connecting bolts and which follow a bored step which starts from the toothed clutch face. The bore diameter is greater than the outer diameter of the connecting bolts and both sides of the cams are followed by ribs extending along the toothed portions.

The advantage of this design is that the connection can be produced with a single tool, since there is no need for any nuts. On the other hand, the cams in connection with the adjoining ribs reinforce the flange so that in the fixing region the tensioning forces are more favorably distributed onto the teeth.

The bored step additionally ensures that a sufficient amount of shank length is available for the connecting bolts in order to achieve a pretension. These bored steps also ensure that the bolts are accurately guided in the direction of the threaded bores without there being any risk of damaging the threads of the threaded bores. Because of the special arrangement of cams in connection with the ribs, it is also possible to use a less expensive material for the flange, for example, malleable cast iron. The design does not only simplify manual assembly, but also automatic assembly because the tools are used from one end only.

In a further embodiment, the ribs extend at a right angle relative to the teeth of the toothed portion, and the ribs starting from the cams either have a decreasing axial thickness or a uniform axial thickness with their ends running out in the radial face. The required deformation, and thus, the distribution of the compressives forces on the teeth, can be modified via the axial thickness and width of the ribs.

In yet another embodiment of the invention, the cam, towards its end face is provided with at least one recess. In this way the region is weakened and by a specific method of deformation, e.g. by caulking, it is possible to secure the connecting bolts additionally in the assembled condition.

The cross-section of the teeth of the toothed portion is preferably designed to be trapezoidal and self-inhibiting, i.e. the angle of inclination of their flanks is such that no axial forces result from the transmission of torque.

The four groups of toothed portions comprise teeth which extend parallel relative to each other. In this way, it is possible to produce the teeth or toothed portions by broaching. Furthermore, it is proposed to divide the toothed portion unevenly, thereby permitting easy accessibility of the bolt holes mutual association in two predetermined positions only.

The prestress and thus the connection between the two flanges can be additionally increased by designing at least one of the flanges to be slightly convex or concave in cross-section especially in the region of the toothed segments, which convex or concave segments are cancelled by deformation during the bolting process.

In yet an additional embodiment, one of the flanges forms part of a hub driving member comprising a toothed slip-on bore and a hub, and the other flange forms part of a flange yoke belonging to a universal joint. The resulting advantages of the invention become particularly apparent if the clutch is used in combination with the universal-jointed shaft in the drive line of a motor vehicle, with the hub driving member being attached to the gear box journal of the vehicle gear box. With motor vehicles in particular, it is important to simplify and automate assembly procedures. Since the driving member follows the vehicle gear box, space conditions are restricted so that accessibility for tools is not easy.

A detailed description of the preferred embodiment of the invention, in connection with the accompanying drawings, follows.

Figure 1:
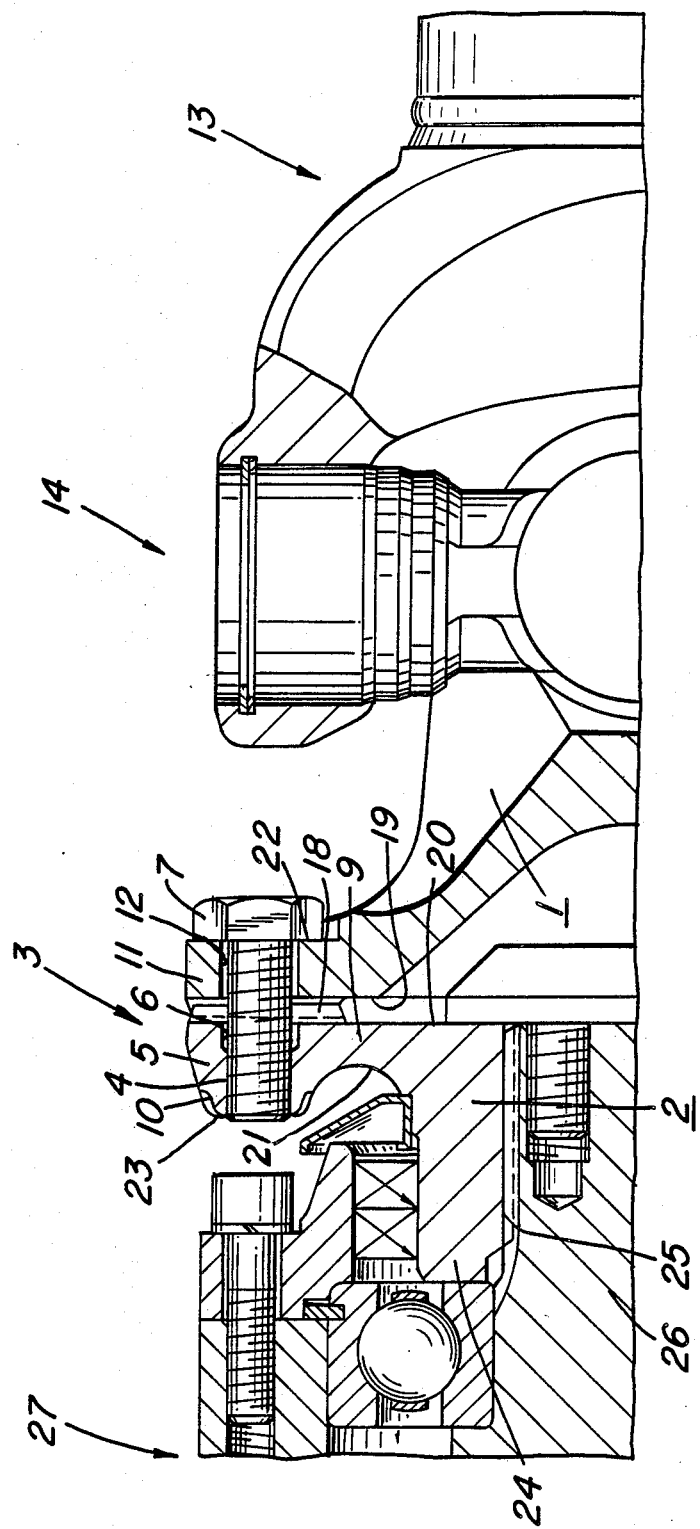
FIG. 1 is a longitudinal section through a disc clutch pursuant to the present invention forming part of the drive line of a motor vehicle.
Figure 2:
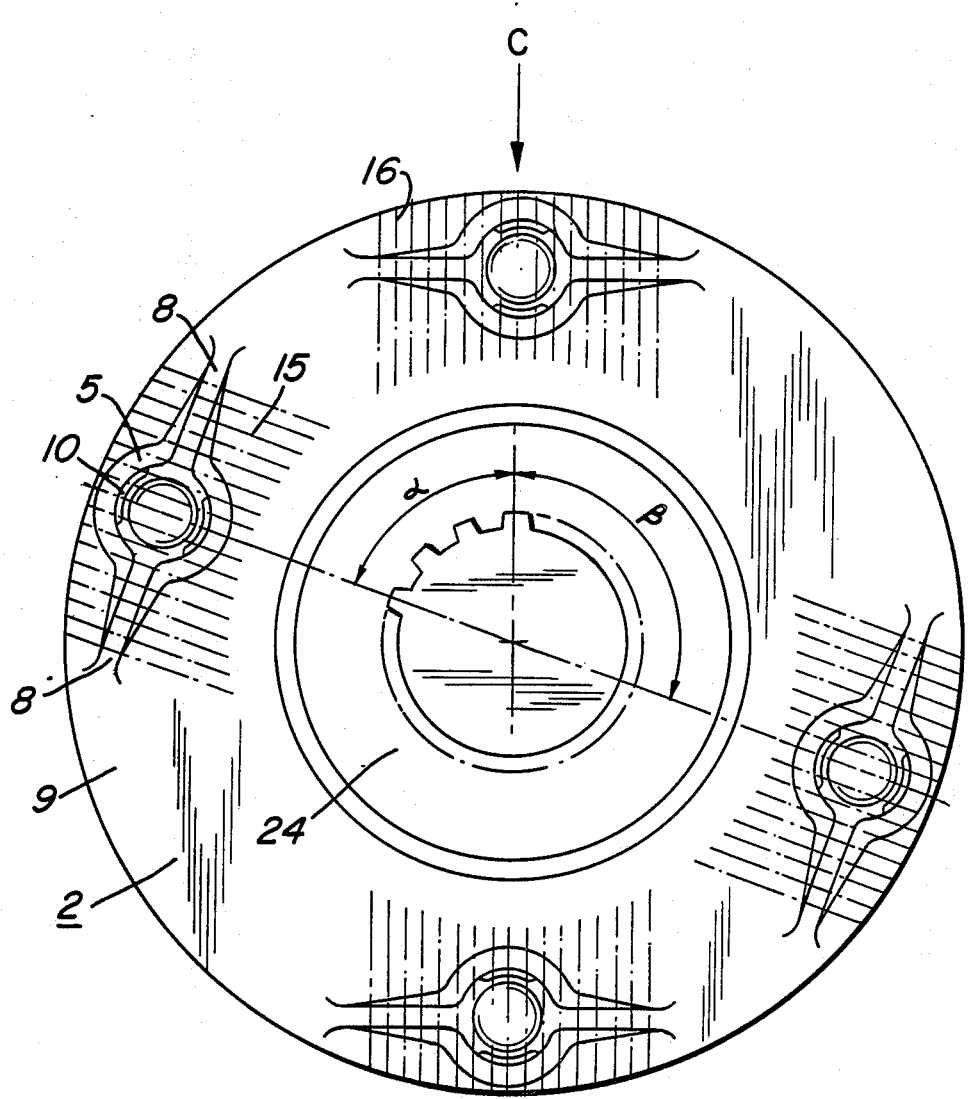
FIG. 2 is a lateral view of a hub driving member representing a detail with cams.
Figure 3:
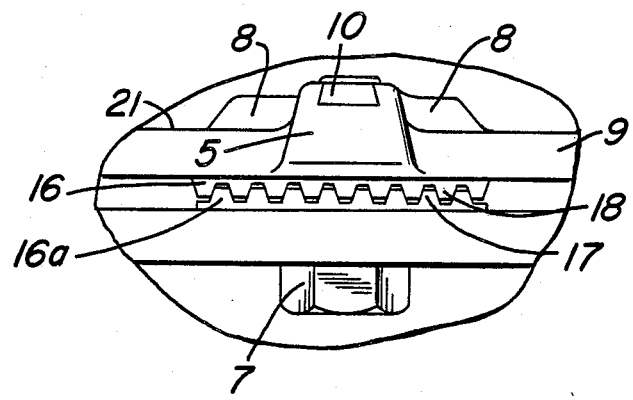
FIG. 3 is a view of a detail in the direction of the arrow C in FIG. 2.

DETAILED DESCRIPTION OF THE PREFERRED EMBODIMENT:

FIG. 1 illustrates a disc clutch 3 which forms a part of a portion of a drive line of a motor vehicle. The disc clutch 3 consists of a first clutch part 1 designed as a flanged yoke, and belonging to a universal joint 14 of a universal-jointed shaft 13, and of a second clutch part 2 designed as hub driving member having a hub 24 slipped onto a gear box journal 26 of a motor vehicle gear box 27 with its toothed slip-on bore 25.

The first clutch part 1, which is designed as a flanged yoke comprises a flange 11 having a clutch face 19 provided with toothed portions 15a, 16a. The toothed portions 15a, 16a each are comprised of a plurality of teeth 17, which extend parallel to each other and are designed to be trapezoidal. The toothed portions 15a, 16a can be produced by broaching. In the central region of each toothed portion 15a and 16a, the flange 11 contains a through-bore 12 through which a connecting bolt 7 may be guided. The head of the connecting bolt 7 rests against a planar face 22.

The hub driving member 2, which forms the second clutch part, consists of the hub 24 provided with the toothed slip-on bore 25 and a flange 9 extending radially relative thereto. The flange 9 has a clutch face 20 provided with toothed portions 15, 16 arranged so as to correspond to the toothed portions 15a, 16a of the clutch face 19 of the flange 11. The toothed portions 15, 16 also comprise trapezoidal teeth 18. The oppositely arranged portions of the two flanges 9, 11 engage each other with their teeth 17, 18 so as to establish a torque connection. In approximately the central region of the toothed portions 15, 16 of the flange 9, a radial face 21, facing away from the clutch face 20, comprises cams 5. The cams starting from their toothed clutch face 20, in order to correspond to the through-bores 12, have been provided with a bored step 6, whose diameter is greater than the outer diameter of the threaded shank part of the connecting bolt 7. The axial length of the bored step 6 is such that the connecting bolt 7 has a sufficient amount of free shank length to achieve the necessary pretension. The bore step 6 is followed by a threaded bore 4 into which the connecting bolt 7 is screwed with its threaded shank.

The flexural prestress can be assisted by a dedicated convex or concave shaping of one of the two flanges 9, 11 at least in the region of the areas interengaging with each other, especially of the toothed segments 15, 16. For adequate bracing when the parts are bolted together a change of shape of the flanges 9, 11 must to begin with occur up to the elimination of the curvature.

On both sides of the cams 5, there follow reinforcing ribs 8, which extend across the width of the toothed portions 15, 16, so as to permit reinforcement and thus, a better distribution of the axial force of the bolts in the toothed portions.

Towards their end faces 23, the cams have been provided with recesses 10, which serve to reduce the cam cross-section so as to permit this region of the cams 5 to be deformed by caulking after completion of the assembly, and to further achieve jamming of the connecting bolt 7 in the threaded bore 4. In this way, additional safety is ensured. Furthermore, the bored step 6 serves to simplify introduction of the connecting bolts with their threaded shafts, so as to ensure that the thread of the threaded bores is not damaged.

As can be seen from FIG. 1, space is limited because the hub driving member 2 is closely arranged at the output of the vehicle gear box 27. Because tightening and access for tools need to be affected from the flange end of the flange driving member 1 of the universal joint 14 only, a simplified assembly is achieved.

The toothed portions 15, 16, as well as 15a, 16a have different angles $\alpha$ and $\beta$ of distance of the circumference. As a result, the connecting bolts 7 are positioned in more easily accessible regions of the flange yoke 1. In addition, assembly may be effected in one specific position only or in two positions offset, relative to each other by 180°.

What is claimed is new and desired to be protected by Letters Patent is set forth in the appended claims.

1. A disc clutch, comprising:
   a first clutch part having a first radially extending flange, said first radially extending flange having a clutch face with a toothed portion and a through hole;
   a second clutch part having a second radially extending flange, said second radially extending flange having a clutch face with toothed portions, and a radial face provided so as to face away from said toothed portions, said first and said second radially extending flanges being removable connected to each other;
   connecting bolts arranged in the region of said toothed portions so as to pass through said through hole in said first clutch part;
   axially projecting cam means provided on the radial face of the flange opposite the clutch face so as to project axially from the radial face, the cam means including a bored step provided so as to start from said toothed clutch face of said second clutch part and having a bored diameter greater than the outer diameter of said connecting bolts, said projecting cam means further including threaded bores provided with threads for said connecting bolts and so as to follow said bored step; and
   reinforcement ribs provided so as to follow both sides of said cam means and extend along said toothed portions.

2. A disc clutch as defined in claim 1, wherein said ribs are provided so as to extend at a right angle relative to the teeth of said toothed portions of said second clutch part.

3. A disc clutch as defined in claim 1, wherein said ribs are provided so as to run out into said radial face from said cam means with a decreasing axial thickness.

4. A disc clutch as defined in claim 1, wherein said cam means includes a plurality of cams each having an end face in the region of which is provided at least one recess.

5. A disc clutch as defined in claim 1, wherein the teeth of said toothed portions have a trapezoidal, self-inhibiting cross-section.

6. A disc clutch as defined in claim 1, wherein the teeth of said toothed portions are provided so as to extend parallel to each other, four of said toothed portions being provided, two of which adjoin in one circumferential direction so as to enclose a greater distance angle than the other two portions which adjoin in another circumferential direction.

7. A disc clutch as defined in claim 1, wherein at least one of said flanges is provided so as to extend in a slightly convex or concave manner in cross-section especially in the region of the toothed segments.

8. A disc clutch according to claim 1, wherein one of said radially extending flanges is provided so as to form part of a hub driving member comprising a toothed slip-on bore and a hub, the other of said radially extending flanges forming part of a flange yoke belonging to a universal joint.

9. A disc clutch as defined in claim 1, and further comprising a motor vehicle having a drive line with a universaljointed shaft, the disc cluth being used in connection with said universal-jointed shaft, said hub driving means being attached to a gear box journal of a vehicle gear box.

* * * * *